United States Patent

[11] 3,620,486

| [72] | Inventors | Jean F. Charpentier<br>Akron;<br>Robert S. Ross, Northfield Center, both of Ohio |
|---|---|---|
| [21] | Appl. No. | 843,282 |
| [22] | Filed | July 9, 1969 |
| [45] | Patented | Nov. 16, 1971 |
| [73] | Assignee | Goodyear Aerospace Corporation<br>Akron, Ohio<br>Continuation-in-part of application Ser. No. 702,866, Feb. 5, 1968, now abandoned.<br>This application July 9, 1969, Ser. No. 843,282 |

[54] AUTOSTABLE CIRCULAR TETHERED WING BALLOON
4 Claims, 11 Drawing Figs.

[52] U.S. Cl. .................................................. 244/33, 244/146, 244/153
[51] Int. Cl. .................................................. B64b 1/50
[50] Field of Search .......................................... 244/31, 32, 33, 153, 154, 146

[56] References Cited
UNITED STATES PATENTS

| 1,835,656 | 12/1931 | Lehmann | 244/146 |
| 1,929,005 | 10/1933 | Rolkerr | 244/146 |
| 3,279,419 | 10/1966 | Demarco | 244/153 |
| 2,988,309 | 6/1961 | Pohl | 244/33 |
| 3,151,825 | 10/1964 | Kindling | 244/33 |
| 3,270,895 | 9/1966 | Stewart | 244/153 |
| 3,412,963 | 11/1968 | Struble, Jr. | 244/31 |

*Primary Examiner*—Milton Buchler
*Assistant Examiner*—Steven W. Weinrieb
*Attorneys*—J. G. Pere and Oldham & Oldham

ABSTRACT: This invention relates to an axisymmetrical-shaped, tethered wing balloon which is substantially autostable in the wind field and, particularly, to a wing balloon which, without performing any rotational motion, is able to keep relatively to the wind direction, a permanent consistent attitude irrespective of changes in wind velocity.

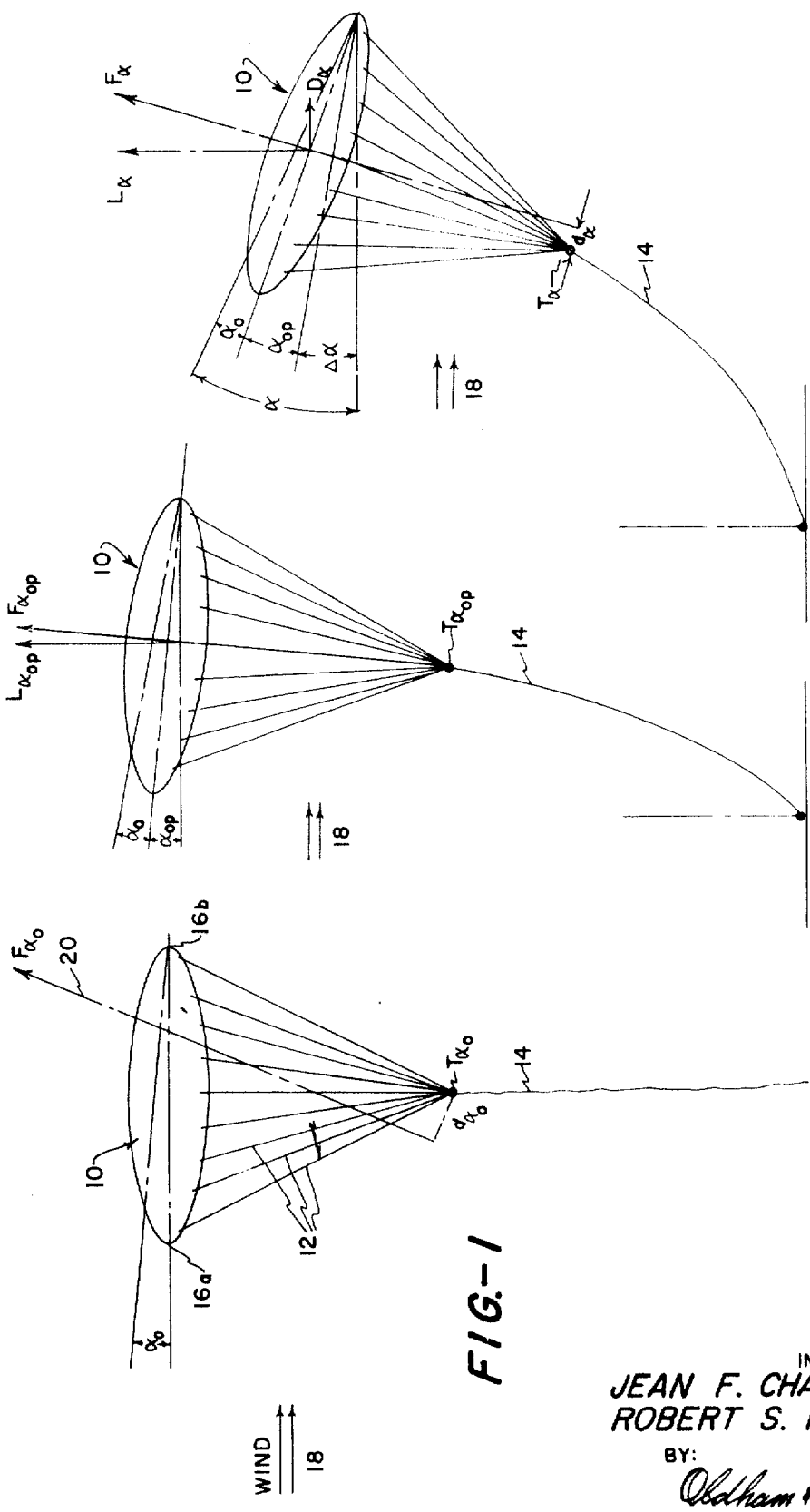

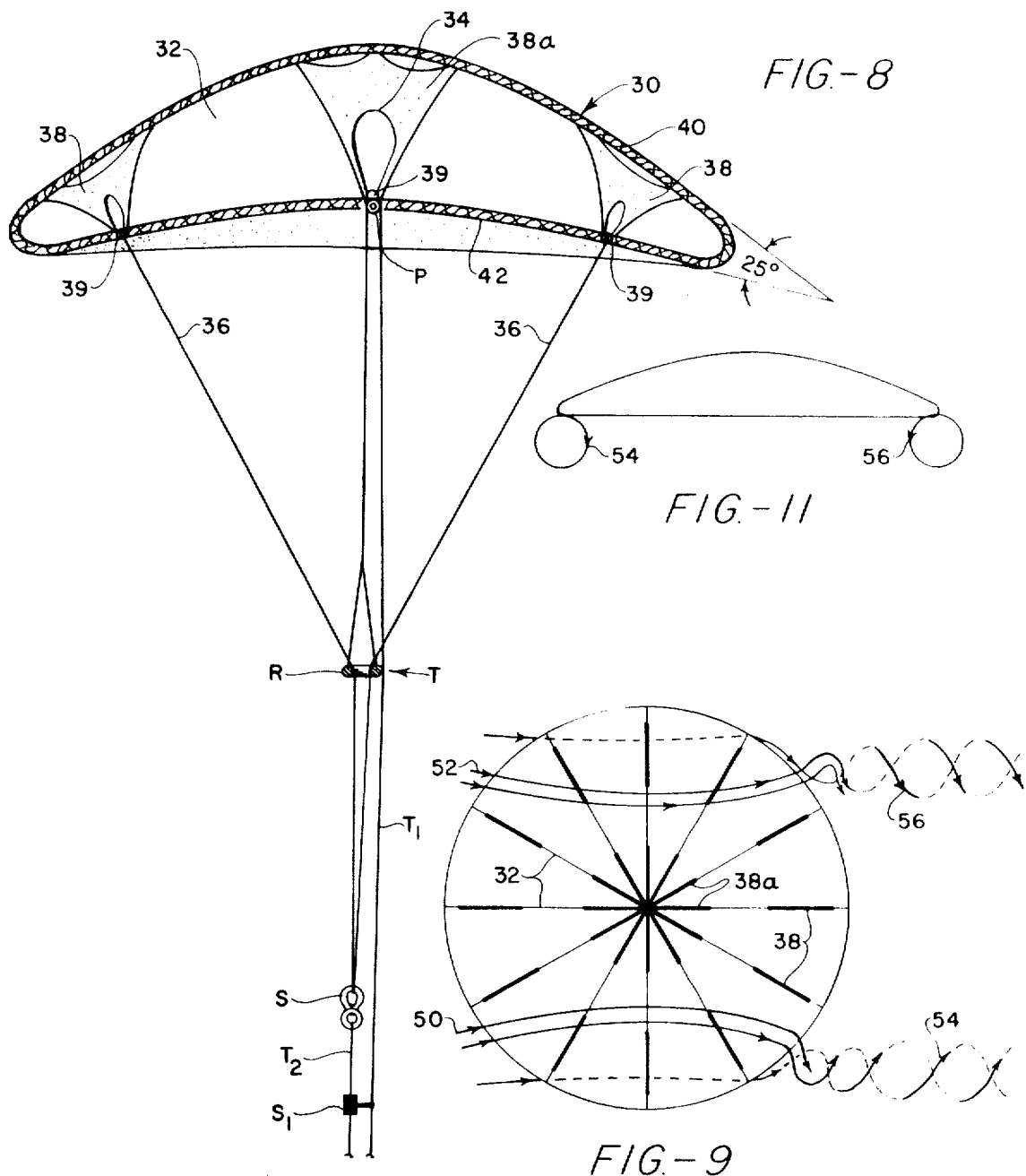

AUTOSTABLE CIRCULAR TETHERED WING BALLOON

This is a continuation-in-part application of my prior application Ser. No. 702,866, filed Feb. 5, 1968, now abandoned.

It is the general object of the present invention to provide a wing balloon adapted to maintain a constant attitude by presenting to the wind direction the same configuration around its entire circular contour. The autostability of the wing balloon is achieved by the unique design of the wing balloon profile section in combination with some well defined appropriate tethered conditions.

In the drawings, FIG. 1 is a diagrammatic side elevation, partially broken away, illustrating the specific characteristics and design of the wing balloon of the invention;

FIGS. 2 and 3 are diagrammatic side elevations similar to FIG. 1, particularly illustrating how the wing balloon of the invention maintains its stable equilibrium position irrespective of wind velocity;

FIGS. 4, 5, and 6 are diagrammatic side elevations illustrating the wing balloon's specific profile shapes able to satisfy the objects of the invention;

FIG. 8 is a cross-sectional illustration of the balloon showing its structural makeup and a suitable variable tether point design;

FIG. 9 is a plan view of the balloon showing its circular shape and the web partitions generating the shape; and FIGS. 10 and 11 illustrate the relationship of the wind to the balloon during flight conditions.

Figure 7:
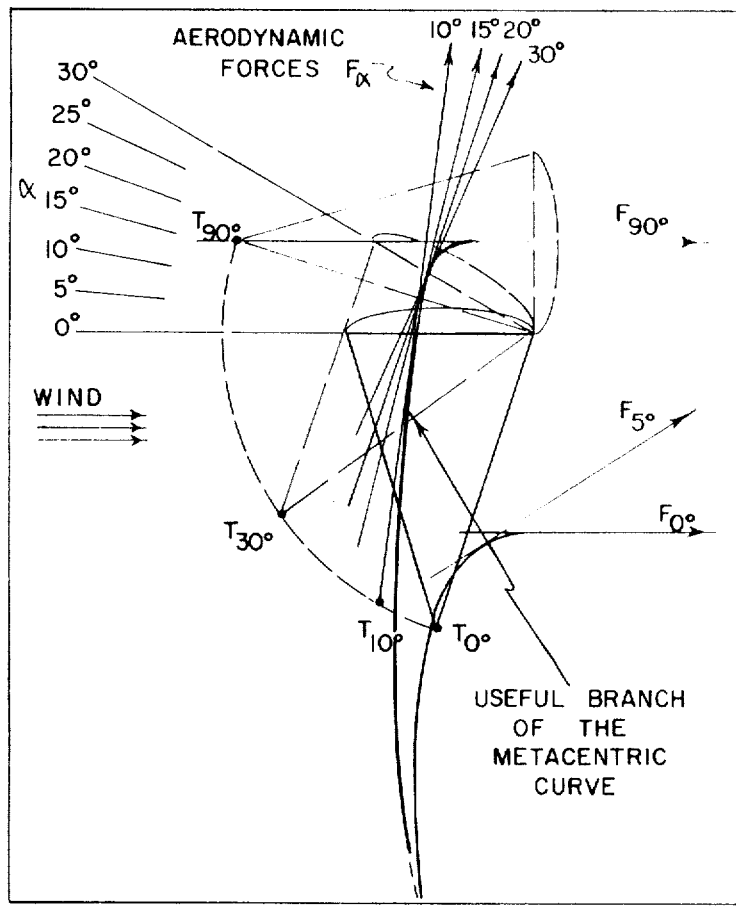
FIG. 7 is a schematic illustration of the metacentric curve for a wing balloon having a profile shape similar to that of FIG. 5.

In the drawings the numeral 10 generally indicates an axisymmetrical-shaped tethered wing balloon. The wing balloon 10 is substantially circular in planform with the wing balloon volume being generated by rotating the profile section of the wing balloon about its symmetrical axis. The profile section of the wing balloon, as best illustrated by FIG. 1, takes a saucer-like form with the identical form of the leading and trailing edges.

The wing balloon 10 is formed from any suitable inflatable fabric material and is normally inflated with a gas lighter than air. A plurality of guy wires 12 secure the wing balloon 10 to a ground cable 14 at a tether point T. The cable 14 may be secured to a movable or fixed point on the ground. A suitable socket connection (not shown) at tether point T permits the entire wing balloon 10 and the guy wires 12 to rotate about the tether point T. The wing balloon 10 and the guy wires 12 are designed to behave like a rigid system relative to the tether point T.

As illustrated in FIG. 8, suitable means may be provided to enable the distance of the tether point T relative to the wing balloon to be varied whereby the location of the tether point T can be selectively adjusted in order to trim the wing balloon in some definite lifting conditions. Note the pulley P which allows tether line $T_1$ to adjust the height of ring R thereby adjusting the tether point T. A swivel S connects the tether line $T_2$ to the ring R. A swivel $S_1$ allows free rotation of tether line $T_1$ around tether line $T_2$.

As best illustrated by FIG. 1, the profile section of the wing balloon 10 is contoured in such a manner that any point can act as a leading edge 16a and further so that low-speed air, indicated by the arrows 18, strikes the front edge 16a of the wing balloon and creates a flow of air around the wing in such a manner that rear stagnation occurs and permanently stays on the back edge 16b of the wing balloon when the wind velocity increases. As the wind blows in the direction of arrows 18, a corresponding generated aerodynamic resultant force indicated diagrammatically by arrow 20 is located substantially before the tether point T, relative to the wind direction, so that the wing balloon responds to the moment: $M_F=F \cdot d$, of the force F by rotating in clockwise direction around the tether point T till the aerodynamic force F passes through said tether point T. At this time the wing balloon equilibrium attitude relative to the wind, seen in FIG. 2, is obtained.

The wing profile is provided with such convenient magnitude of its parameters that the equilibrium attitude angle, $\alpha op$, is the optimum angle for which the aerodynamic forces provides the maximum magnitude of the lift (L) over drag (D) ratio: (L/D)MAX. This ratio defines the "efficiency criterion."

When, however, the wind direction changes from the horizontal direction substantially increases in velocity, the force of such will be sufficient to move the wing balloon in the direction of the wind (see FIG. 3), out of the equilibrium position shown in FIG. 2.

As the balloon moves from the equilibrium position illustrated in FIG. 2 in the direction of the wind to a new and greater angle of attack $=\alpha=\alpha 0+\alpha op+\Delta\alpha$, aerodynamic force shifts towards the trailing edge and becomes $F_\alpha$, (see FIG. 3), the direction of which passes behind the tether point T to a distance $d_\alpha$, the magnitude of which depends upon the values of the selected parameters. Thus the force $F_\alpha$ has, relatively to the tether point T, a restoring moment which returns the wing balloon to the equilibrium position where it remains till affected by another outside force.

Figure 4:
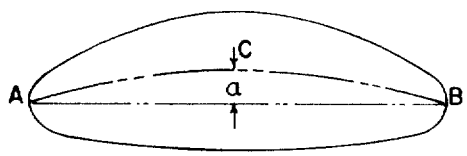
Figure 5:
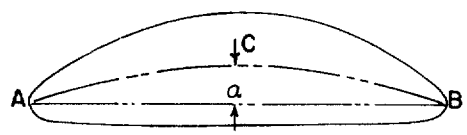
Figure 6:
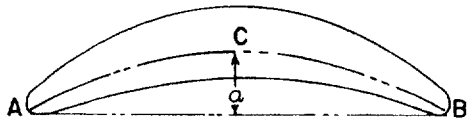

FIGS. 4, 5, and 6 illustrate some types of profile able to satisfy the stability conditions and criterion (L/D)MAX., explained above.

The profile of such a wing balloon must have a curvature of the mean line indicated by chain dotted line ACB, denoted "camber." To meet the objects of the invention a "mean cambered line" must have a center point above the center of a chord $\overline{AB}$ connecting the two theoretical stagnation points A and B, when the direction of the airflow at upstream infinity is parallel to the direction $\overline{AB}$. The three airfoil shapes illustrated in FIGS. 4, 5, and 6 meet these requirements.

Thus, the general principal of a tether wing balloon having a circular contour in order to be towed in any direction without change of attitude is summarized as follows:

The wing balloon has to be considered as a rigid system with its suspension lines tied altogether at the tethering point T. The position of the tethering point T, relative to the balloon, depends upon the aerodynamic characteristics of the profile of the wing balloon and can be varied from the ground. The aerodynamic characteristics upon which the stability of such a device is obtainable are the following:

1. A great angular coefficient $\mathcal{M}$ of the function: (Lift/Drag) $\mathcal{M}_\alpha$ 2. An appropriate sign and magnitude of the zero lift moment coefficient: $C_{\mathcal{M}_0}$ To be autostable the aerodynamic force generated by the wing must have a restoring moment which progressively increases in absolute value when it is displaced from its predetermined equilibrium position. Such a restoring moment is relative to the axis of rotation of the device; because the wing balloon and its suspension lines constitute a rigid system, the center of rotation always passes through the tether point. The tether point, therefore, fulfills the function of a center of gravity and the aerodynamic moments will be referred to same.

As best seen in FIGS. 8 and 9, the structure of the balloon comprises an outer skin 30 which maintains the airfoil shape when inflated by a plurality of webs 32 extending across the diameter like spokes from a center 34 and connected to the skin 30 in a suitable manner such as by sewing or adhesives. The attachment of the tether cables 36 is to catenary reinforcement panels 38 which lie on each side of the respective webs 32 and are affixed thereto again by any suitable means such as sewing or adhesives. These panels 38 spread the cable load over a larger area of the balloon. The pulley P is connected to catenary panels 38a which again are associated with the webs 32 around the center 34. A gromet eye 39 connects the cables and pulley to their respective panels so that the fluid tight relation of the skin is maintained. The invention contemplates that the webs 32 will have some openings therethrough so that equal pressure will be present through the balloon.

It is important to note that the shape defined by the webs 32 is substantially two conical surfaces 40 and 42 of various angles. In essence, the invention contemplates that an angular difference between the surfaces 40 and 42 should be between about 10° to about 35° with the optimum angle being about 25°. Naturally the tops and ends of the surfaces 40 and 42 are rounded to give a smooth airflow.

An unconventional method to study the stability condition of a flying machine is to compare that which has been developed for ships, which consists of developing the curve of the aerodynamic resultant corresponding to many angles of attack, known as the "metacentric curve," as shown in FIG. 7.

The mechanism of the aerodynamic force is performed as follows:

When balloon is in static equilibrium at the angle $\Delta_0$, as soon as the wind blows the aerodynamic force $F\alpha_0$ is generated. The tether point $T\alpha_0$ is located at such an appropriate distance $d\alpha_0$ behind the force $F\alpha_0$, that a corresponding positive moment of coefficient $M_{d_0} = F\alpha_0 \cdot d\alpha_0$ is generated, FIG. 1.

This initial aerodynamic moment tends, therefore, to increase the angle of attack $\alpha_0$. If the natural wind, or the relative wind due to the motion transmitted to the wing balloon, continues to increase, the angle of attack increases, too, till reaching the selected optimum equilibrium angle, $\alpha op$, which in the given example is equal to 10°: $\alpha op=10°$, as seen in FIG. 2, for which the criterion function $L/D f(\alpha)$ reaches the maximum value: $(L/D)$MAX.$=7$. In this situation, the lift force passes through the tether point, and the tether point is located on the metacentric curve. Therefore, the tether point coincides with the metacenter to satisfy the required dynamic condition of stability.

The characteristics of the airfoil are selected to allow such a convenient location to the tether point, so that from this equilibrium position and all along the useful range of variation of the angle of attack $\alpha$ the angular displacement of the tether point T increases faster than the corresponding angular displacement of the aerodynamic force.

Under this condition, when the angle of attack $\alpha$ increases from $\alpha op=10°$ to $\alpha=30°$, the magnitude of distance $d\alpha$ of the aerodynamic force to the tether point T negatively and continuously increases as a direct function of the angle of attach $\alpha$, FIG. 3.

Similarly, the magnitude of the force coefficient $C_F = \sqrt{C_L^2 + C_D^2}$ also increases as a direct function of the angle of attack $\alpha$ but in positive magnitude.

Therefore, the moment coefficient: $C_{M_T}$ which is equal to the product of two continuously increasing functions of opposite signs increases negatively, and in this way the criterion of static stability is satisfied.

The above description and theory is also true for any kind of floating body immersed in any kind of fluid, and generating a dynamic lifting component of any positive or negative sign.

The path of airflow around the balloon is critical to achieve a high L/D and increase the stability characteristics of the balloon. FIGS. 10 and 11 illustrate the airflow as proven by hydrostatic tests. In effect, airflow indicated as approaching the balloon in parallel paths 50 and 52 is swirled outwardly as it moves across the upper and lower balloon surfaces into oppositely rotating vortex streams 54 and 56. These vortex streams tend to hold the trailing edge of the balloon down thus creating an extremely large lift for small angles of attack. FIG. 11 shows how the vortex force acts on the trailing edge of the balloon. $L/D$ ratios of as high as 6.214 at 5° angle of attack are indicated by the test results. Note also that the vortex streams 54 and 56 are displaced by the angle $w$ from the direction of laminar flow around the balloon. This also enhances the increased L/D.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A circular wing balloon which comprises an inflatable bladder formed to an air foil shape having a uniform profile generated by rotating a specific profile section about its symmetrical axis, wherein the profile is defined by a pair of stacked conically shaped surfaces concentrically aligned with an angle between the surfaces defining the lateral edges being between 10° to about 35° to provide an identical air foil shape of the leading-trailing edges, a smooth curved configuration to the apex portions of each surface and the air foil edges, a plurality of angularly separated web means attached to the surfaces of the bladder to maintain the shape thereof, a fixed cable, and tethering means connecting the wing balloon to the cable at a tether point.

2. The balloon according to claim 1 which includes catenary panels attached to the web means to connect the cable means to the balloon around the circumferential edge thereof.

3. A balloon according to claim 1, where the tether point of the wing balloon is adjustable to a selected equilibrium angle of attack.

4. The combination according to claim 1 wherein the distance extended between the tether point and the wing balloon can be made variable in order to trim the wing balloon in some definite optimum lifting condition.

* * * * *

UNITED STATES PATENT OFFICE
CERTIFICATE OF CORRECTION

Patent No. 3,620,486  Dated November 16, 1971

Inventor(s) Jean F. Charpentier and Robert S. Ross

It is certified that error appears in the above-identified patent and that said Letters Patent are hereby corrected as shown below:

Col. 3, line 15, "$\Delta_0$" should be -- $\alpha_0$ --.

Col. 3, line 27, "L/Df($\alpha$)" should read -- L/D = f($\alpha$) --.

Signed and sealed this 23rd day of May 1972.

(SEAL)
Attest:

EDWARD M. FLETCHER, JR.
Attesting Officer

ROBERT GOTTSCHALK
Commissioner of Patents